Patented May 1, 1934

1,957,408

UNITED STATES PATENT OFFICE 1,957,408

PROCESS OF PREPARING BITUMINOUS EMULSIONS

Eugen Hutzenlaub, Stuttgart, Germany, assignor to Firma Paul Lechler, Stuttgart, Germany No Drawing. Application July 30, 1932, Serial No. 627,129. In Germany August 17, 1931

3 Claims. (Cl. 134—1)

The present invention relates to a process of preparing bituminous emulsions, and in particular it relates to the preparation of emulsions of high viscosity. The high viscosity of emulsions is a goal which has been continuously striven for during the development of this particular art, because it possesses many and various distinct advantages. The stability and insensitiveness against shaking, against frost and against high temperature are increased by increasing the viscosity, and it is possible or desirable to increase the consistency of the mixture by adding solid or liquid substances. In this connection emulsions which are to be used for thick coatings, mortar construction and the like, a thick, pasty consistency is desirable. Also asphalt emulsions used in road construction or surfacing are more suitable if they are of increased consistency, because when the emulsion is used for surfacing roads or admixed with mineral aggregate in the sub-grade or road foundation, thinly liquid emulsions flow too freely and as a result the asphalt is not deposited in the desired places. For example, if the asphalt emulsion is to be used to surface a road, a thinly liquid asphalt emulsion will flow to the side of the road before the emulsion has been "broken" by evaporation of the water, with the result that insufficient asphalt will be deposited on the central portion of the road. Again, where asphalt emulsions are used in conjunction with the crushed rock and other mineral aggregate in the sub-grade, the asphalt emulsion will flow too freely through the mass of crushed rock and other mineral aggregate if it is of low viscosity. Therefore in order to lower the flowability of asphalt emulsions it is desirable to increase the viscosity so that it will not flow too readily from the area upon which they are deposited. Thus if a thin asphalt emulsion is sprayed on the mineral aggregate constituting the sub-grade of a road undergoing construction, it is very desirable that the asphalt emulsion flows slowly into the crushed rock mass, thus permitting "breaking" of the asphalt emulsion by evaporation of the water, with a consequent disposition of the asphalt uniformly throughout the mass of crushed rock and other mineral aggregate. With regard to the use of asphalt emulsions for the surfacing of roads or for the coating of a concrete highway after the initial set has taken place, the purpose of the asphalt emulsion is to prevent evaporation of water and as a result to accelerate the curing of the concrete. It has been found that thinly liquid asphalt emulsions flow off the central portion of the concrete road to the sides thereof, with the result that only a very thin layer of the emulsion remains in the central portion of the road. This is a very undesirable condition, because in order to prevent evaporation of the water in the freshly spread concrete, a layer of asphalt should be present which is of substantial thickness.

The present applicant is aware of the fact that many processes have been known prior to the present application, in which the object is to produce an asphalt emulsion of a high degree of viscosity. In this connection applicant calls attention to the French Patent No. 614,819 and U. S. Patent No. 1,733,495. According to the processes of these patents it is noted, however, that the viscosity of the emulsions is increased by adding to the asphalt an acid substance. The present applicant has found that by giving the asphalt a preliminary treatment with an alkaline substance, the formation of emulsions is greatly expedited, and furthermore that a viscosity can be obtained in this manner which is greater than any heretofore obtainable. In carrying the invention into effect the asphalt is first melted and then about 5% by weight of potassium or sodium hydroxide or potassium or sodium carbonate are intimately mixed therewith by stirring. The emulsion is then prepared in known manner, using clay. In order to further illustrate the specific manner of carrying the present applicant's invention into effect, the following specific example is given.

Example 50 parts by weight of asphalt is melted at a temperature of about 120° C. and 1 part by weight of concentrated sodium hydroxide solution (approximately 50° Bé.) is added thereto. The mass is thoroughly stirred to insure a thorough and homogeneous intermixture. The mixture is then emulsified with 49 parts by weight of an aqueous clay suspension. There results a thick paste of greatly improved stability which does not "break" for an extended period of time and which is sufficiently stable to be transported long distances without "breaking" the emulsion, and which may be used alone or in conjunction with sand and similar materials in cement mortar work.

It is evident that the facilitation of the emulsification and the thickening of the emulsion is caused by the transformation of certain ingredients of the asphalt under the influence of the basic substances. Concentrated potassium hydroxide or sodium hydroxide or potassium carbonate or sodium carbonate change the structure of asphalt, that is to say of the petroleum asphalt, by saponifying the naphthene acids contained in the asphalt. The saponified products of the naphthenic acids facilitate and accelerate the emulsification of the petroleum pitch. This is a fact easy to understand, because soap is a well known dispersing agent. Naturally enough saponification is not obtained by treating asphalt with acid. Acidic substances set free the naphthene acids contained in the asphalt but they do not of course, change them into a salt as do the alkalies.

Moreover, by saponification of the naphthene acids contained in the asphalt, a considerable thickening of the emulsion is obtained. The emulsion described in the example will become so thick that a cylinder of it will stand erect or in other words, is self-shape retaining. This emulsion is substantially dry to the touch, yet miscible with water or in other words is hydrophilic. If the emulsion is prepared with the same quantities of the continuous and the dispersed phase and of dispersing agent but without the relatively small amount of caustic alkali or sodium hydroxide, a liquid product will be obtained.

It is a fact that different sorts of asphalt behave differently in respect of emulsification and consistency of the final product. However the present process may be carried out on all kinds of petroleum asphalt which are in general use for preparing emulsions. With these various kinds of petroleum pitch, facilitation and acceleration of the emulsifying process and thickening of the emulsion will be as stated, whereas natural asphalt for example v. gr. gilsonite or Trinidad Lake asphalt which have become chemically stable in the course of time, so that they will hardly be affected by treatment with alkalies in the usual manner, respond readily to this treatment. That is to say, the method described herein is not applicable to natural asphalts.

I claim:

1. The method of preparing stable, highly viscous hydrophile asphalt emulsions which comprises subjecting an asphalt to a preliminary treatment in which the asphalt is mixed with a small amount of a concentrated solution containing one of the group consisting of alkali metal hydroxides and carbonates for the purpose of substantially neutralizing free acid contained in the asphalt, and then mixing the neutralized asphalt with a quantity of water containing clay while stirring, whereby the neutralized asphalt is emulsified.

2. The method of preparng stable asphalt emulsions which comprises subjecting a given weight of asphalt to the influence of a considerably smaller volume of a concentrated alkaline solution containing one of the group consisting of alkali metal hydroxides and carbonates for the purpose of substantially neutralizing free acid contained in the asphalt and then mixing the neutralized asphalt with a quantity of water containing clay while stirring, whereby a thick self shape-retaining paste comprising the emulsified asphalt is obtained.

3. The method of preparing stable asphalt emulsions which comprises melting the said asphalt with up to 5% by weight of one of the group consisting of alkali metal hydroxides and carbonates in the form of a concentrated solution for the purpose of substantially neutralizing free acid contained in the asphalt, and then mixing the neutralized asphalt with a quantity of water containing clay while stirring, whereby a thick self shape-retaining paste comprising the emulsified asphalt is obtained.

EUGEN HUTZENLAUB.